Patented June 6, 1950

2,510,564

UNITED STATES PATENT OFFICE 2,510,564

TRIALLYL CYANURATE AND INSECTICIDAL COMPOSITIONS CONTAINING THE SAME

James R. Dudley, Cos Cob, Conn., assignor to American Cyanamid Company, New York, N. Y., a corporation of Maine No Drawing. Application October 2, 1946, Serial No. 700,839

5 Claims. (Cl. 167—33)

This invention relates to a new chemical compound and more particularly to a new triazine derivative. The invention especially is concerned with the production of a new and useful unsaturated monohydric alcohol triester of cyanuric acid, more particularly triallyl cyanurate, and with insecticidal compositions comprising the same.

The triallyl cyanurate of this invention may be represented graphically by the following general formula:

I

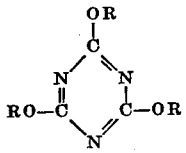

where R represents an allyl radical.

The triallyl cyanurate of this invention may be used, for example, as a solvent, plasticizer, insecticide, bactericide, etc. It also may be employed alone or in combination with other polymerizable materials to yield new synthetic materials (polymers and copolymers) of particular utility in the plastics and coating arts. Such synthetic materials are disclosed and claimed in the copending applications of Edward L. Kropa, Serial No. 700,833, filed concurrently herewith, and Serial No. 9,639, filed February 19, 1948.

Various methods may be employed to produce the triallyl cyanurate of this invention. One method which is especially suitable for use in preparing triallyl cyanurate and other cyanuric triesters of primary, ethylenically unsaturated monohydric alcohols comprises effecting reaction between cyanuric chloride or bromide and such a primary alcohol corresponding to the ester desired under alkaline conditions and in the presence of a hydrohalide acceptor. The reaction may be carried out under a variety of temperature and pressure conditions, for instance at normal or at elevated temperatures, e. g., at the reflux temperature of the mixed reactants, and at atmospheric or superatmospheric pressure. However, atmospheric pressure and temperatures of the order of 10° to 40° C., more particularly ordinary room temperatures (20°–30° C.), are preferred. In general, the yields are somewhat higher when the reaction is effected in large part at temperatures of about 10° to 40° C. than when the reaction is carried out in its entirety at the reflux temperature of the mixed reactants. Generally, prolonged heating at the higher temperatures causes the yield of triester to be lower due to the formation of hydroxytriazines. However, in order to insure complete reaction and thereby to obtain an optimum yield the reaction mass may be heated at an elevated temperature, e. g., at temperatures of the order of 70° to 80° C. or even up to the reflux temperature of the reaction mass, toward the end of the reaction period.

If desired, the reaction may be effected in the presence of an inert solvent or mixture of solvents, that is, one which will not react with the reactants in the reaction mass. Illustrative examples of solvents that may be employed are ethers (e. g., diethyl ether, dibutyl ether, etc.), ketones (e. g., acetone, diethyl ketone, methyl ethyl ketone, etc.), liquid hydrocarbons (e. g., benzene, toluene, xylene, etc.), dialkyl ethers of ethylene glycol (e. g., dimethyl ether of ethylene glycol, etc.), dioxane, etc.

Various hydrohalide acceptors may be employed. I prefer to use a hydrohalide acceptor that will react with the cyanuric chloride or bromide to form a water-soluble salt and which will provide alkaline conditions in the reaction mass during the entire reaction period. Illustrative examples of hydrohalide acceptors that may be employed are inorganic bases, e. g., alkali-metal hydroxides (e. g., sodium hydroxide, potassium hydroxide, etc.), alkali-metal carbonates (e. g., sodium carbonate, potassium carbonate, etc.), calcium hydroxide, barium hydroxide, trisodium phosphate, etc.; organic bases, for instance tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like. I prefer to use sodium hydroxide or sodium carbonate.

The amount of hydrohalide acceptor may be varied considerably, but to insure alkaline conditions during the entire reaction period it should be employed in an amount corresponding to at least 3 mols of the hydrohalide acceptor per mol of cyanuric chloride or bromide.

The amount of unsaturated monohydric alcohol that is employed likewise may be varied considerably, but in all cases it is used in an amount corresponding to at least 3 mols of the alcohol per mol of cyanuric chloride or bromide. I prefer to use an excess of the alcohol over that required, that is, more than 3 mols, e. g., from 4 to 50 or more mols, of alcohol per mol of cyanogen halide.

Another method that may be used in preparing cyanuric triesters that cannot be prepared directly or readily by reaction between cyanuric chloride or bromide and an unsaturated alcohol involves the transesterification of a lower triester of cyanuric acid, e. g., trimethyl cyanurate, with the unsaturated alcohol. This method is illustrated by Example 7.

In order that those skilled in the art better may understand how the present invention may be carried into effect, the following examples are given by way of illustration and not by way of limitation. All parts are by weight.

Example 1

|  | Parts | Approx. Mol Ratios |
|---|---|---|
| Cyanuric chloride | 185.5 | 1 |
| Allyl alcohol (90%) | 870.0 | 13.2 |
| Sodium carbonate, anhydrous | 318.0 | 3 |

To a stirred suspension of 318 parts of anhydrous sodium carbonate in 870 parts of 90% allyl alcohol contained in a three-necked, round-bottomed flask, there was added 185.5 parts of cyanuric chloride. The cyanuric chloride was added in small portions and at such a rate that the temperature did not rise above 40° C. Vigorous stirring was maintained at all times.

When the addition of the cyanuric chloride had been completed, the mixture was heated gradually on the steam bath over a period of 3 hours to 75° to 80° C., and filtered. The filter-cake was washed with 100 ml. of allyl alcohol. The filtrate and washings were combined and the excess allyl alcohol was removed by distillation under reduced pressure. The crude material weighed 212 parts (85% of the theoretical). A small sample which had been recrystallized from aqueous methanol melted at 29-30° C., boiled at 137 to 140° C. at 0.4 to 0.5 mm. pressure, and gave the following analytical results:

| | Percent N |
|---|---|
| Calculated for $C_{12}H_{15}N_3O_3$ | 16.87 |
| Found | 16.84 |
| | 16.66 |

Example 2

|  | Parts | Approx. Mol Ratios |
|---|---|---|
| Cyanuric chloride | 185.5 | 1 |
| Allyl alcohol (90%) | 870.0 | 13.2 |
| Sodium hydroxide | 120.0 | 3 |

In a 2-liter, three-necked, round-bottomed flask fitted with a mechanical stirrer and a thermometer was placed 870 parts of 90% allyl alcohol containing 120 parts of dissolved sodium hydroxide. The use of powdered sodium hydroxide facilitates the preparation of this solution. The alkali was dissolved in the allyl alcohol at room temperature (20° to 30° C.) or slightly below, as any heating of the alkali-alcohol mixture promotes excessive discoloration of the allyl alcohol, much of which is carried over into the final product. The stirrer was then started and the addition of 185.5 parts of solid cyanuric chloride begun. The reaction was rapid and vigorous, and the addition of the total amount of cyanuric chloride required about 1 hour. The mixture was stirred for 2 hours at room temperature and filtered with suction on a Büchner funnel. The filter-cake comprising sodium chloride was washed with 150 ml. of allyl alcohol. The combined filtrate and washings were concentrated on a steam bath under reduced pressure until nearly all the allyl alcohol had been removed. One liter of water was then added and the distillation was continued until about another 300 to 400 ml. of distillate had been collected. The volume of the mixture in the distilling flask at this point was about 600 to 700 ml. As much as possible of the supernatant aqueous layer was then decanted from the crude triallyl cyanurate and was replaced by 200 ml. of 5% NaOH solution. The mixture was stirred vigorously, and the layers allowed to separate. The upper aqueous layer was decanted as before and the process repeated with fresh 5% NaOH solution and finally with warm water until all the alkali had been removed. The triallyl cyanurate was dried by heating under reduced pressure on a steam bath. There was obtained about 187 parts of triallyl cyanurate, which is about 76% of the theoretical.

Example 3

Essentially the same procedure was followed as described under Example 2 with the exception that about 684 parts of 100% allyl alcohol was employed, and the cyanuric chloride was dissolved in about 414 parts of dioxane and added to the allyl alcohol-sodium hydroxide mixture. Triallyl cyanurate in an amount corresponding to about 71% of the theoretical was obtained.

Example 4

Same as Example 3 with the exception that about 317 parts of acetone was used in place of 414 parts of dioxane. A yield of triallyl cyanurate corresponding to about 68% of the theoretical was obtained.

Example 5

Same as Example 2 with the exception that about 318 parts cyanuric bromide is used in place of 185.5 parts cyanuric chloride.

The following example illustrates the preparation of a different unsaturated monohydric alcohol triester of cyanuric acid from that which is claimed in the present application. More particularly, Example 6 shows the production of trimethallyl cyanurate.

Example 6

Same as Example 2 with the exception that about 1060 parts of 90% methallyl alcohol is used in place of 870 parts of 90% allyl alcohol. A good yield of trimethallyl cyanurate is obtained.

Example 7

This method of preparing triallyl cyanurate involves the transesterification of trimethyl cyanurate with allyl alcohol.

|  | Parts | Approx. Mol Ratio |
|---|---|---|
| Trimethyl cyanurate | 55.0 | 2.2 |
| Allyl alcohol (Substantially pure) | 171.0 | 29.4 |
| Sodium | 2.3 | 1.0 |

In a 500 ml. round-bottomed, three-necked flask equipped with a stirrer, a thermometer and a 65 cm. fractionating column packed with chips of silicon carbide there were placed 55 parts of trimethyl cyanurate, 171 parts of allyl alcohol and 2.3 parts of sodium dissolved in about 40 parts of methanol. The flask was immersed in an oil bath and heating was begun. When the bath temperature reached 115° C. the methanol began to distill over. A total of 62 parts of methanol was collected, which corresponded to approximately 88% of the theoretical. The residue in the flask was filtered, and the excess allyl alcohol was removed by distillation on a steam bath under reduced pressure. The residue remaining in the flask was washed once with a 3% aqueous solution of sodium hydroxide to remove any hydroxytriazines and then was washed with water until neutral to litmus. The residue comprising triallyl cyanurate was dried by heating under reduced pressure. The dried ester weighed 57 parts, which corresponded to about 71% of the theoretical.

*Example 8*

Twelve ml. of a solution of triallyl cyanurate (1 part of triallyl cyanurate in 1000 parts of 65% aqueous acetone) was sprayed on a nasturtium plant bearing *Aphis rumicis* while the plant was revolving. The number of dead insects was counted after 48 hours, a correction being applied for a blank determination in which the solvent alone was sprayed on the plant under the same conditions. The corrected kill was then calculated. The results were as follows:

Number of insects_____ 336
Percentage of kill_____per cent__ 63

In marked contrast when a trialkyl cyanurate, specifically trimethyl cyanurate, was similarly tested the results were as follows:

Number of insects_____ 536
Percentage of kill_____per cent__ 22.8

By methods such as hereinbefore described, other unsaturated monohydric alcohol triesters may be prepared, e. g., tripropenyl cyanurate, tri-isopropenyl cyanurate, tri-(1-butenyl) cyanurate, tricrotyl cyanurate, tri-(3-butenyl) cyanurate, tri-(1,3-butadienyl) cyanurate, etc.

In a manner similar to that described above with particular reference to the preparation of certain unsaturated monohydric alcohol triesters of cyanuric acid (2,4,6-trihydroxy-1,3,5-triazine), specifically triallyl and trimethallyl cyanurates, corresponding derivatives of the 3,5,6-trihydroxy-1,2,4-triazines and of the 4,5,6-trihydroxy-1,2,3-triazines may be prepared.

What I claim as new and desire to secure by Letters Patent of the United States is:

1. Triallyl cyanurate.
2. An insecticidal composition comprising triallyl cyanurate dissolved in a solvent comprising acetone.
3. An insecticidal composition comprising triallyl cyanurate dissolved in aqueous acetone.
4. An insecticidal composition comprising triallyl cyanurate dissolved in 65% aqueous acetone.
5. An insecticidal composition consisting of, by weight, 1 part of triallyl cyanurate dissolved in 1000 parts of 65% aqueous acetone.

JAMES R. DUDLEY.

REFERENCES CITED

The following references are of record in the file of this patent:

UNITED STATES PATENTS

| Number | Name | Date |
|---|---|---|
| 2,275,467 | Pollack | Mar. 10, 1942 |
| 2,296,823 | Pollack | Sept. 2, 1942 |
| 2,306,440 | Heintrich | Dec. 29, 1942 |
| 2,443,740 | Kropa | June 22, 1948 |

OTHER REFERENCES

Heilbron: Dictionary of Organic Compounds.